Feb. 25, 1941.  S. HINDS  2,233,009
VEHICLE LIFT
Filed July 15, 1939  18 Sheets-Sheet 1

INVENTOR.
Sherwood Hinds
BY Wilkinson, Huxley, Byron & Knight
ATTORNEYS

Feb. 25, 1941. S. HINDS 2,233,009
VEHICLE LIFT
Filed July 15, 1939 18 Sheets-Sheet 2

Inventor
Sherwood Hinds
By Wilkinson, Huxley, Byron & Knight
Attorneys

Feb. 25, 1941.    S. HINDS    2,233,009
VEHICLE LIFT
Filed July 15, 1939    18 Sheets-Sheet 3
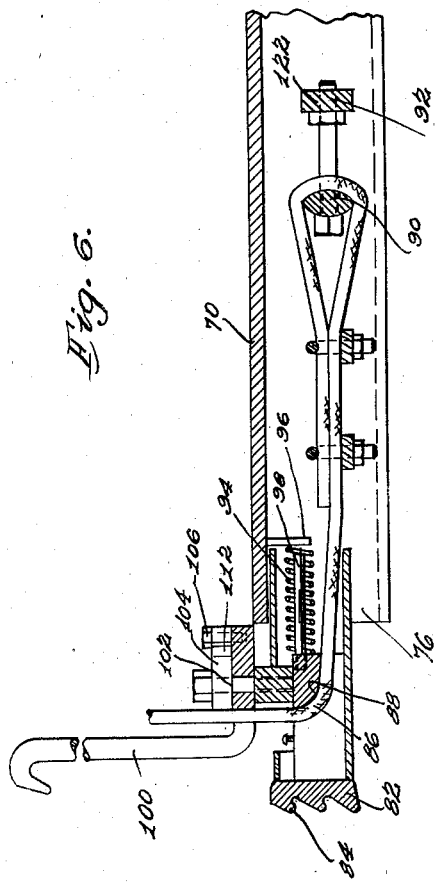
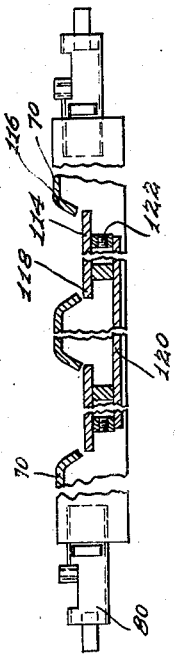
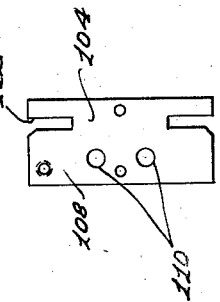
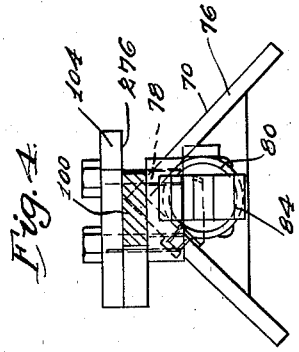
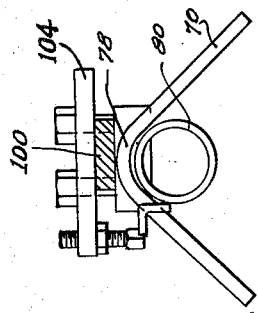
Inventor
Sherwood Hinds
By Wilkinson, Huxley, Byron & Knight
Attorneys

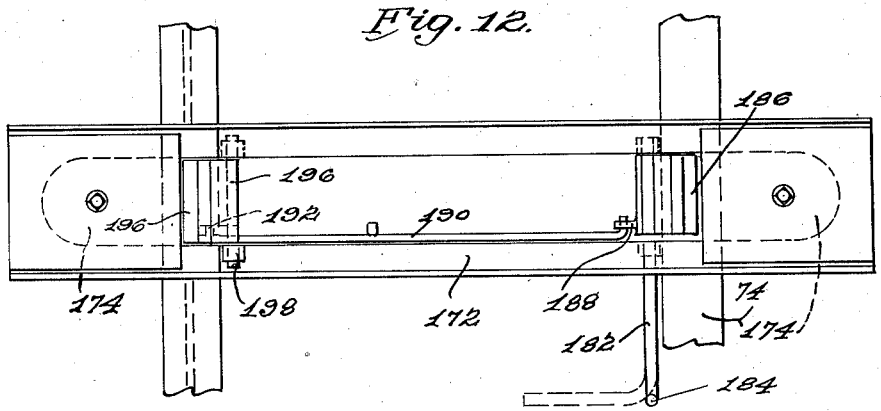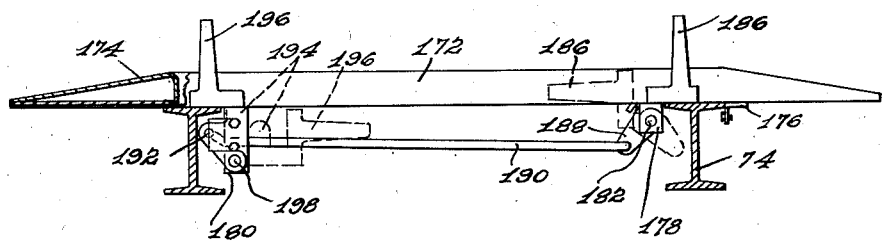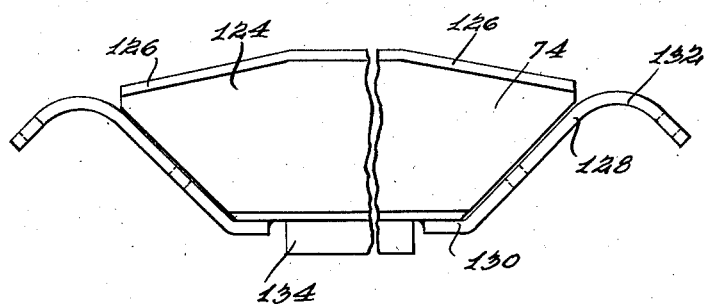

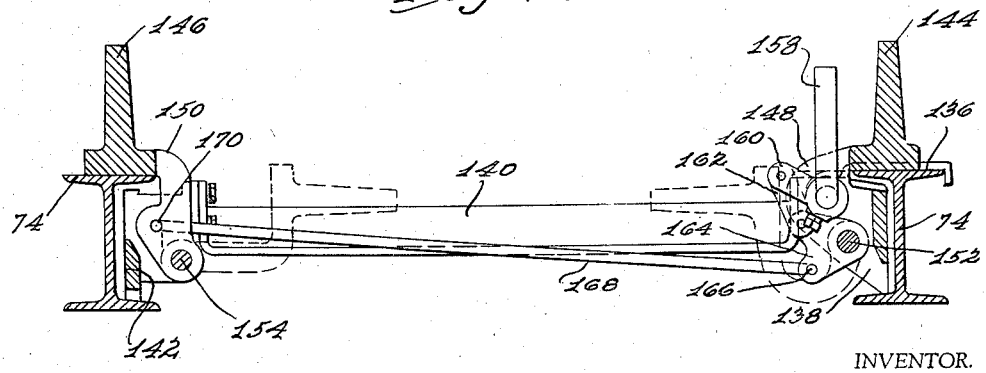

Feb. 25, 1941.     S. HINDS     2,233,009
VEHICLE LIFT
Filed July 15, 1939     18 Sheets-Sheet 6
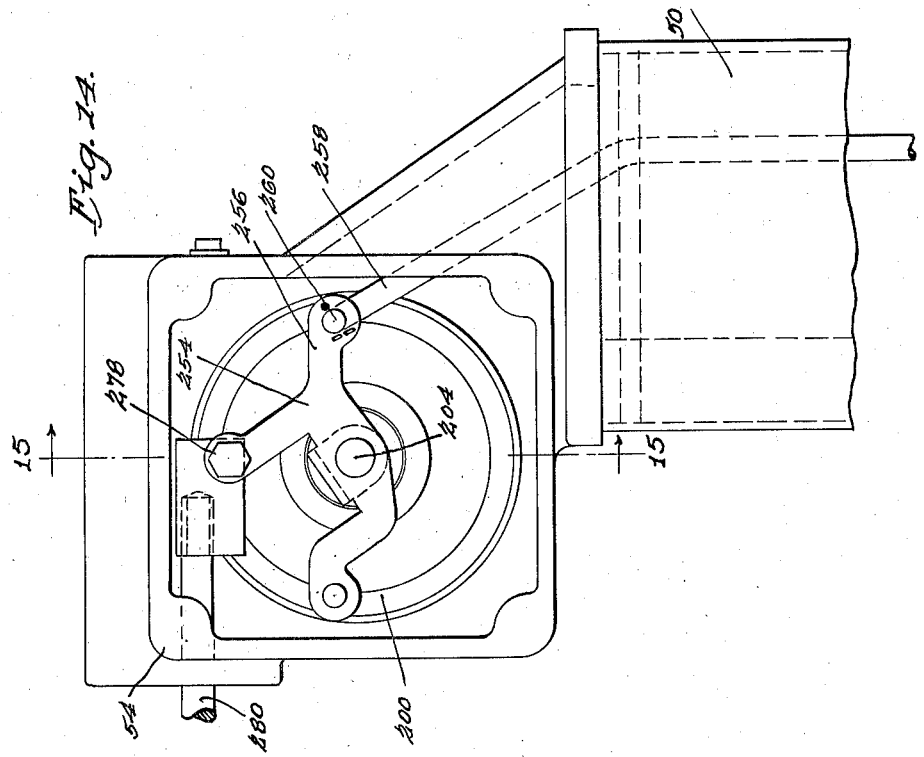
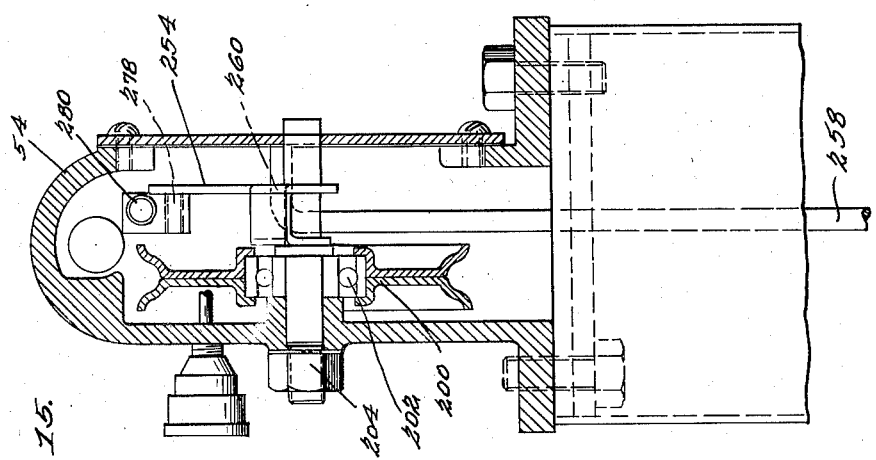
INVENTOR.
Sherwood Hinds
BY
Wilkinson, Huxley, Byron & Knight
ATTORNEYS Feb. 25, 1941.　　　S. HINDS　　　2,233,009
VEHICLE LIFT
Filed July 15, 1939　　18 Sheets-Sheet 7

INVENTOR.
Sherwood Hinds
BY Wilkinson, Huxley, Byron & Knight
ATTORNEYS

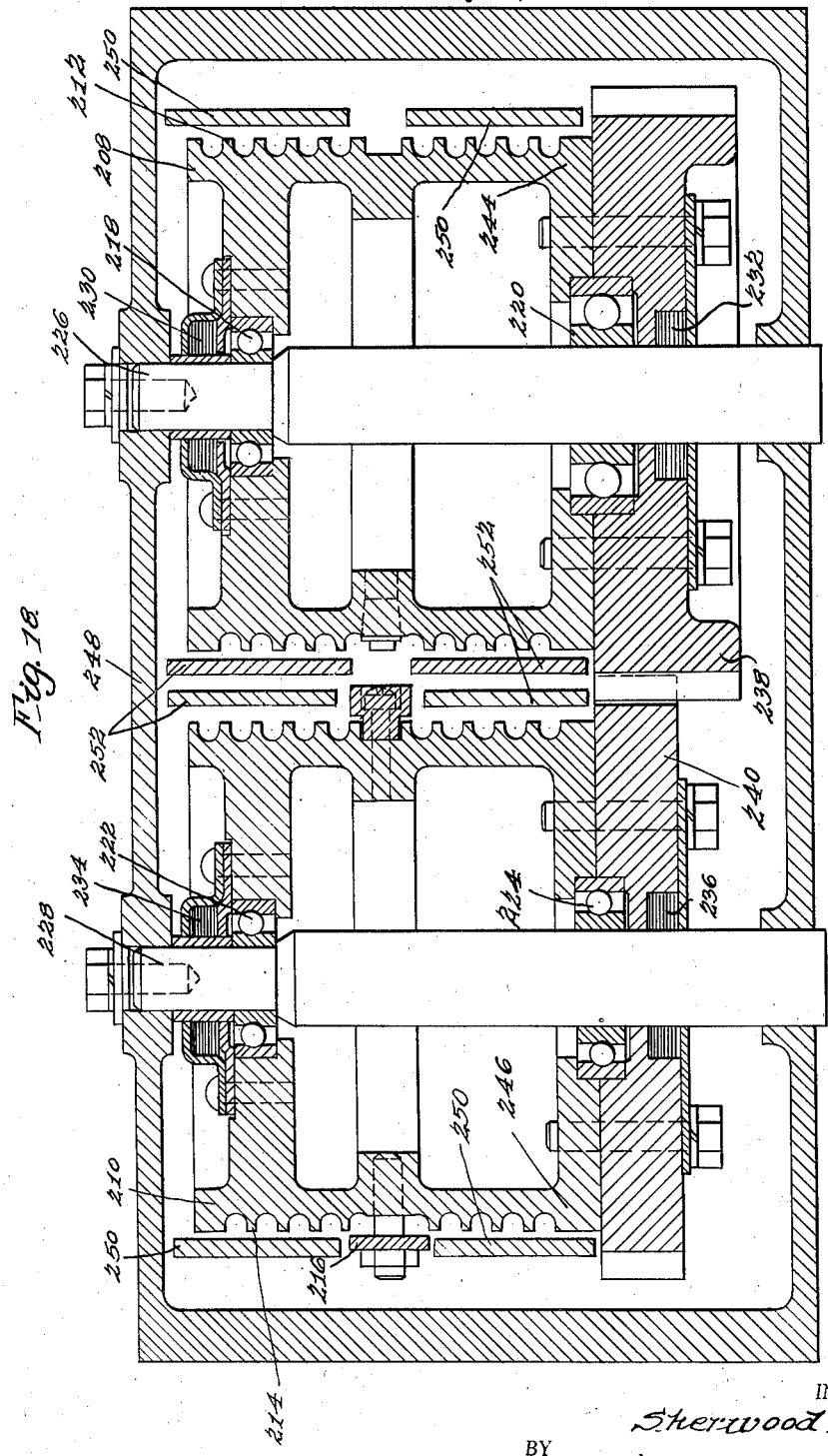

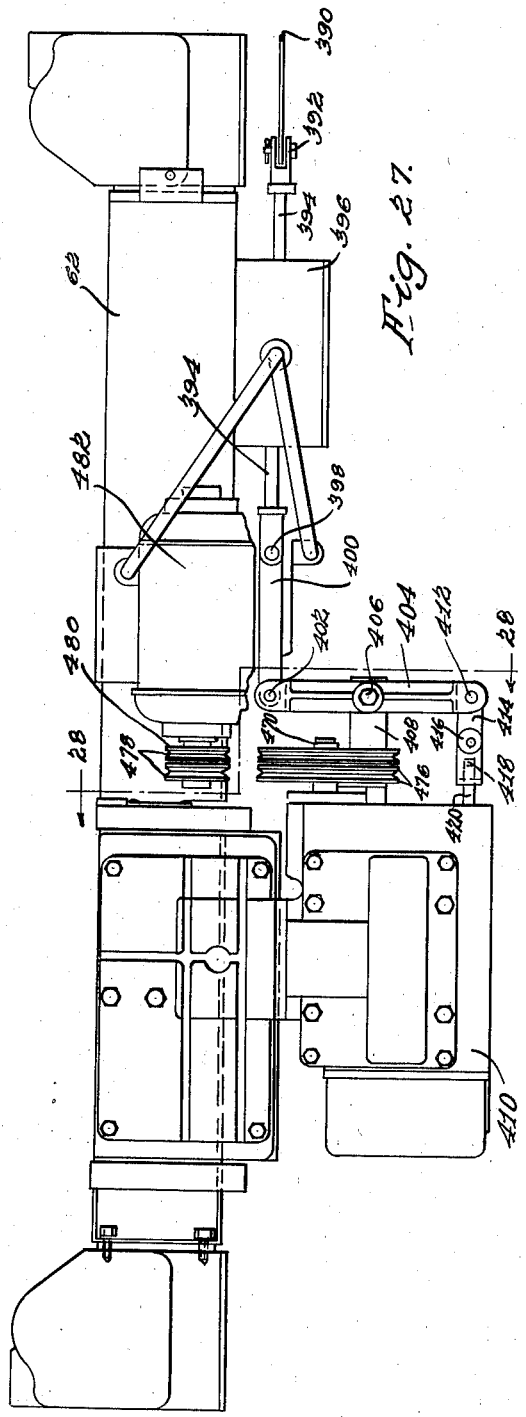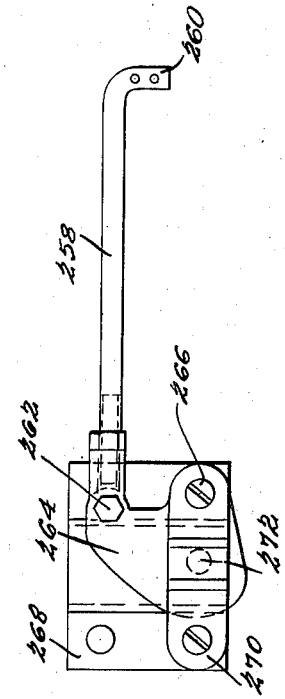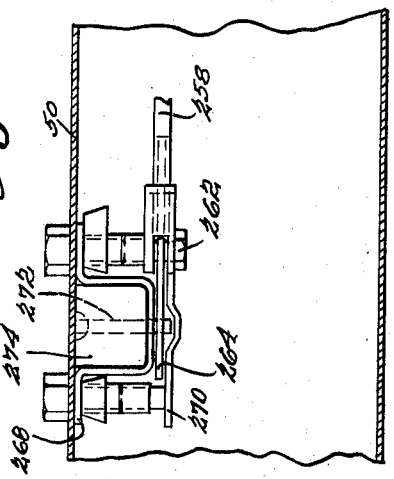

Feb. 25, 1941.     S. HINDS     2,233,009
VEHICLE LIFT
Filed July 15, 1939     18 Sheets-Sheet 10

Inventor
Sherwood Hinds
By Wilkinson, Huxley, Byron & Hughs
Attorneys

Feb. 25, 1941.  S. HINDS  2,233,009
VEHICLE LIFT
Filed July 15, 1939   18 Sheets-Sheet 11
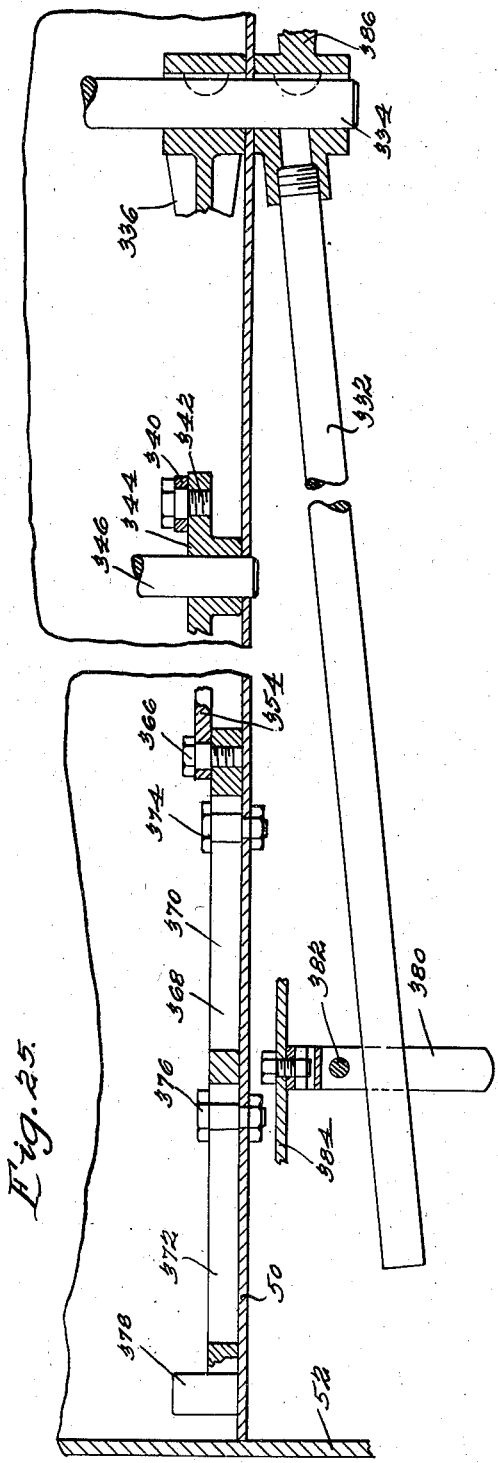
Fig. 25.   Fig. 24.
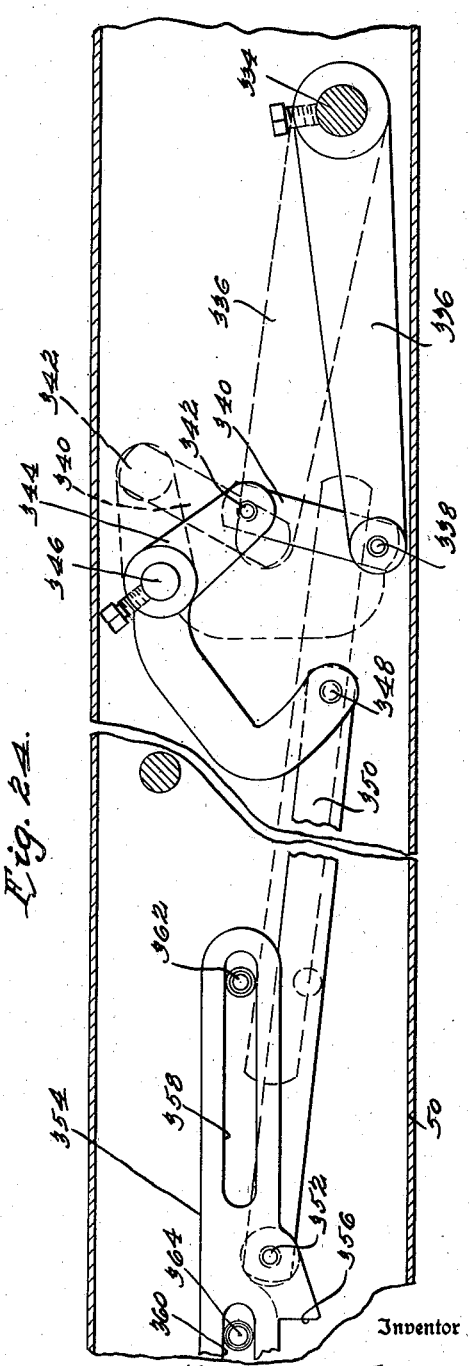
Inventor
Sherwood Hinds
By Wilkinson, Huxley, Byron & Knight
Attorneys Feb. 25, 1941.  S. HINDS  2,233,009
VEHICLE LIFT
Filed July 15, 1939   18 Sheets-Sheet 12
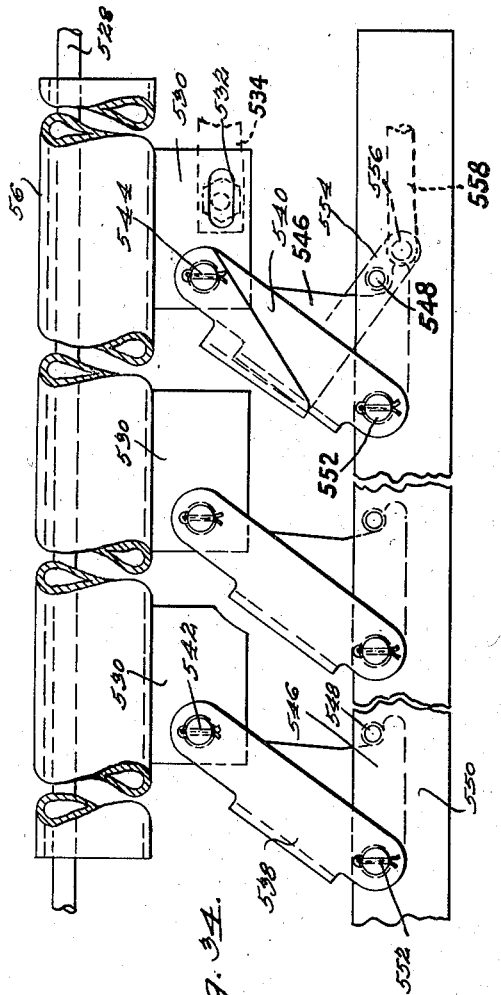
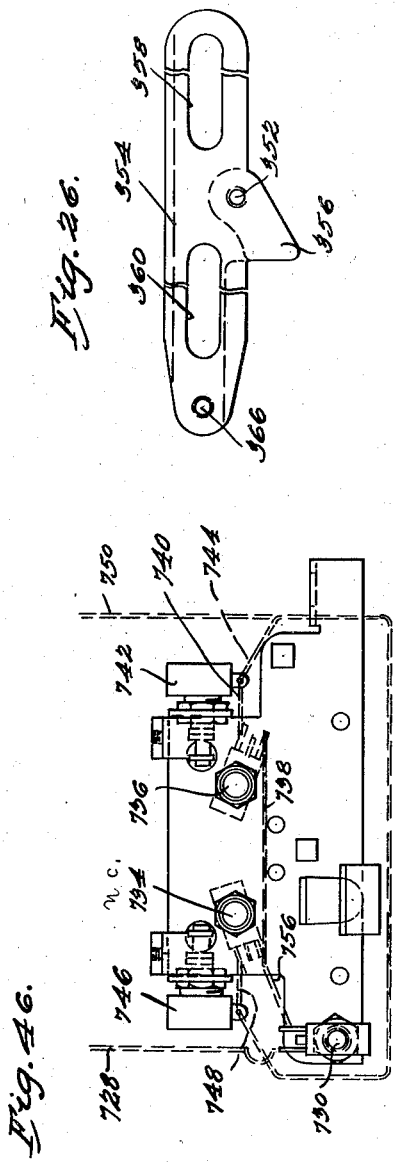
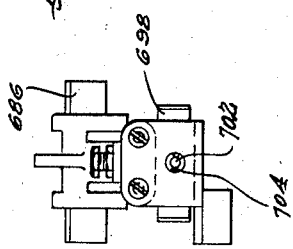
Inventor
Sherwood Hinds
By Wilkinson, Huxley, Byron & Knight
Attorneys

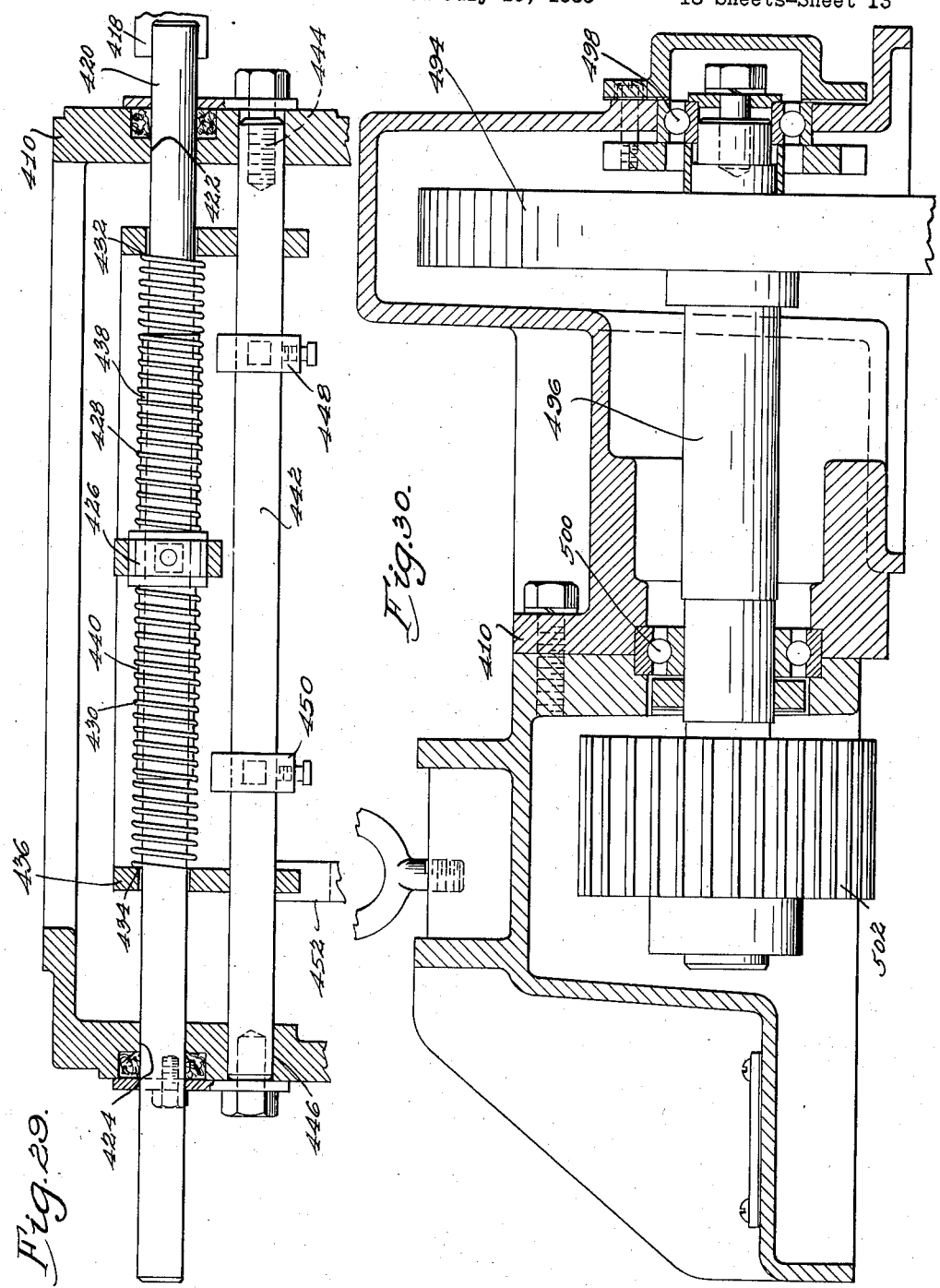

Feb. 25, 1941.   S. HINDS   2,233,009
VEHICLE LIFT
Filed July 15, 1939   18 Sheets-Sheet 14
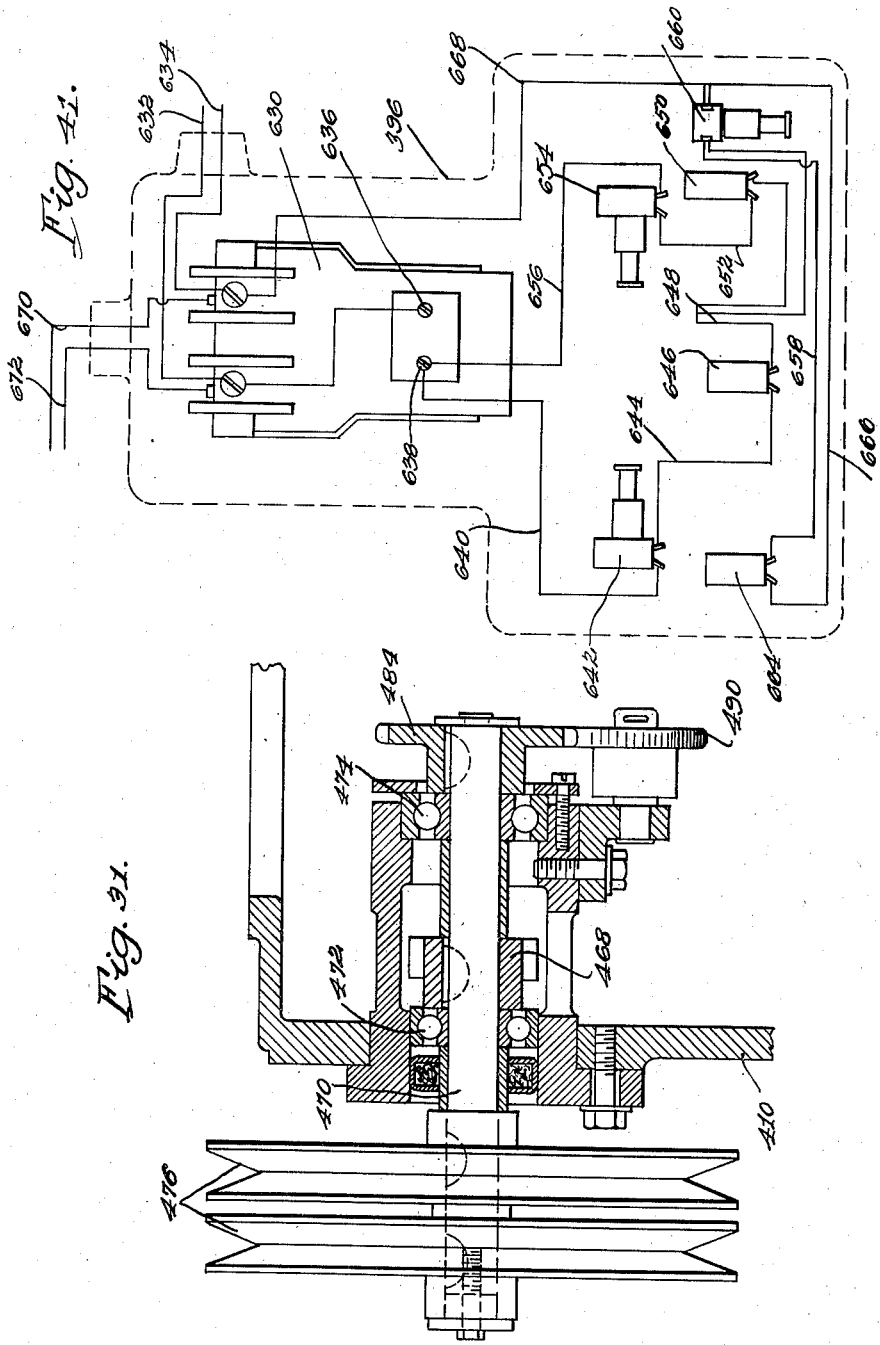
INVENTOR.
Sherwood Hinds
BY Wilkinson, Huxley, Byron & Knight
ATTORNEYS

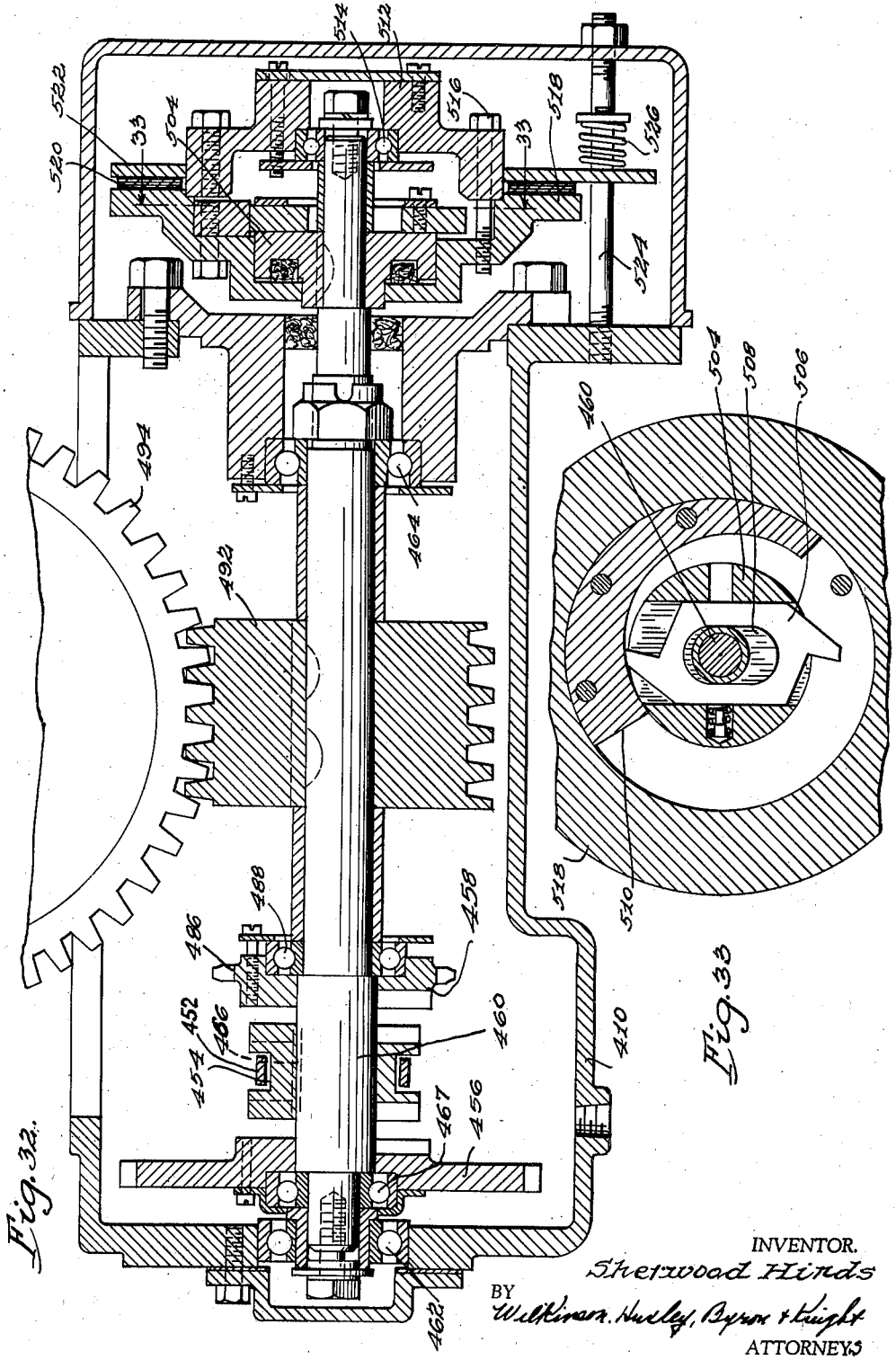

Feb. 25, 1941.　　　　S. HINDS　　　　2,233,009
VEHICLE LIFT
Filed July 15, 1939　　　18 Sheets-Sheet 16
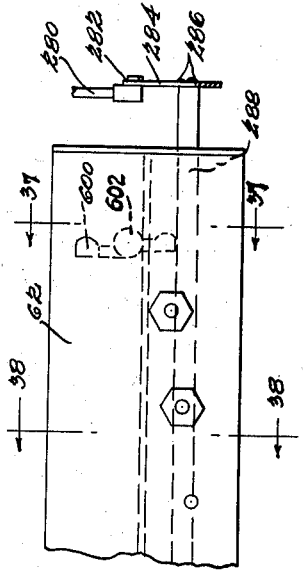
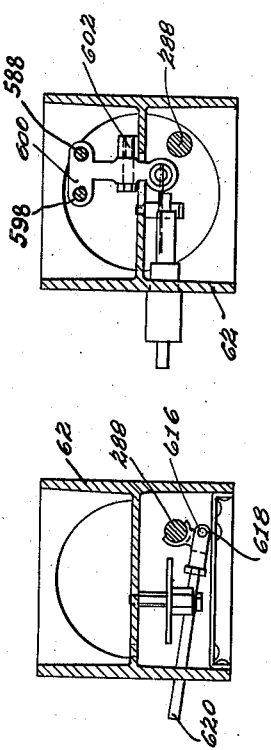
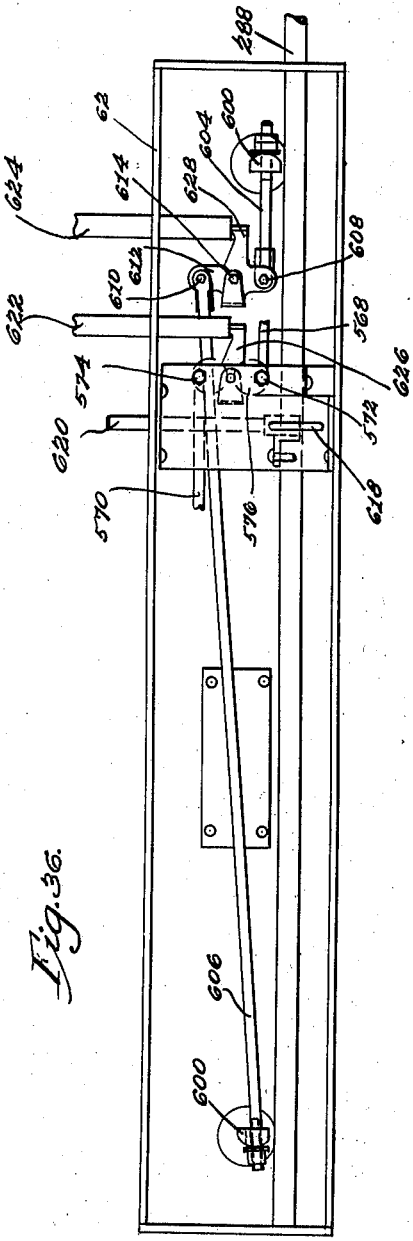
Inventor
Sherwood Hinds
By Wilkinson, Hurley, Byron & Knight
Attorneys Feb. 25, 1941.                     S. HINDS                      2,233,009
                                 VEHICLE LIFT
                Filed July 15, 1939            18 Sheets-Sheet 17
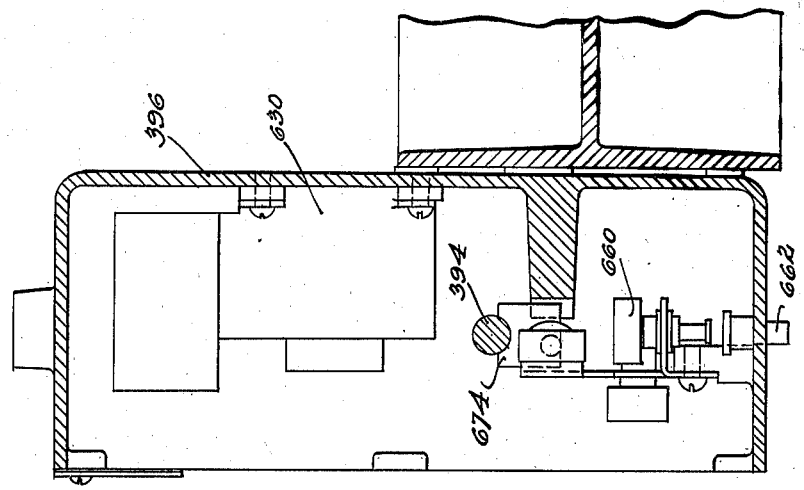
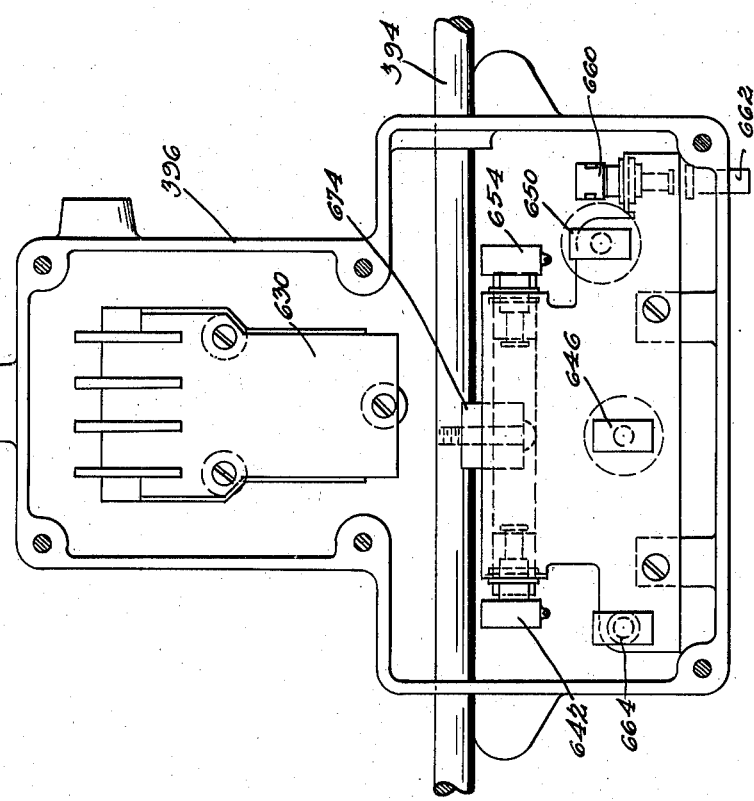
INVENTOR.
Sherwood Hinds
BY
Wilkinson, Huxley, Byron & Knight
ATTORNEYS

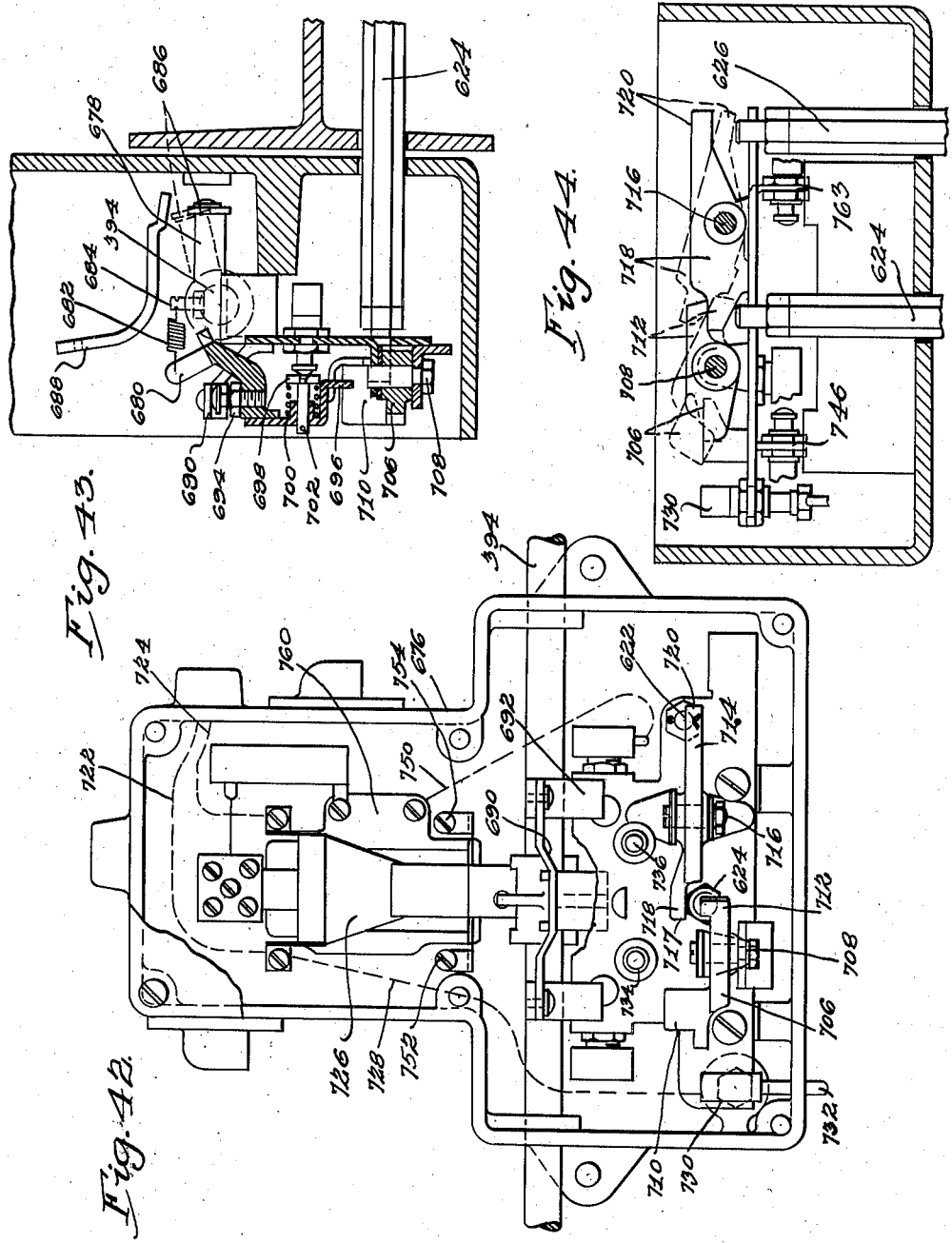

Patented Feb. 25, 1941

2,233,009

UNITED STATES PATENT OFFICE 2,233,009

VEHICLE LIFT

Sherwood Hinds, Columbia City, Ind., assignor to The Wayne Pump Company, Fort Wayne, Ind., a corporation of Maryland Application July 15, 1939, Serial No. 284,738

18 Claims. (Cl. 254—144)

This invention pertains to a vehicle hoist, and more particularly to a four-post hoist or lift for automobiles and the like.

It is an object of this invention to provide a four-post lift which is of rigid construction whereby it need not be embedded in a foundation.

Another object is to provide a lift having a dead man control.

Still another object is to provide an electrically operated lift wherein a single directional motor is used.

Yet another object of the invention is to provide a lift having safety means thereon to prevent the carriage from dropping in the event of breaking or stretching of the supporting means.

A further object is to provide means preventing further operation of the carriage in the event any part of the vehicle engages safety operating means.

Another further object is to provide lift mechanism wherein a brake for the carriage is provided operative only for one direction of movement of said carriage.

Still another further object is to provide a lift having operating mechanism which has means for operating the motor for raising the carriage through other than the usual operating levers, in the event the carriage should be contacting the latches in such a way as to prevent operation thereof.

A different object is to provide a lift having a cable drum having cables for the carriage extending to more than one support and wherein means are provided in the supports for controlling the operating means under predetermined conditions.

A still different object is to provide chocks for a lift wherein means for knee action automobile axles are provided, and chocks for front and back wheels are provided, said chocks being movable and operable from a single point.

A yet different object is to provide a lift wherein certain structural members are constructed under predetermined stresses.

Another different object is to provide a supporting and load sustaining member wherein safety means is formed therein.

An object is to provide a carriage having safety means adapted to be rendered inoperative by the normal operation of the device but releasable should any part of the lift fail.

Another object is to provide a lift wherein the transverse beams are structural shapes, but so formed in part as to permit ready passage of the vehicle over said beams.

Still another object is to provide a lift wherein cable guiding means is provided for the drums to prevent slippage or tangling of the cables.

Yet another object is to provide switch mechanism for a lift which is operated mechanically and electrically to control the lift, and wherein means is provided to prevent failure of the switch mechanism, said switch mechanism being controllable by normal operating means and through a plurality of safety means.

With these and various other objects in view, the invention may consist of certain novel features of construction and operation as will be more fully described and particularly pointed out in the specification, drawings and claims appended hereto.

In the drawings, which illustrate embodiments of the devices and wherein like reference characters are used to designate like parts—

Figure 4 is an end elevation partly in section of one of the undercarriage cross members of said lift and showing a latch member;

Figure 5 is an end elevation corresponding to Figure 4 but with the carriage latch extension omitted;

Figure 6 is an enlarged sectional elevation of the member shown in Figure 4 showing safety means therefor and the cable securing means, the same being taken transversely of the lift;

Figure 7 is an enlarged top plan view of a carriage latch extension for the cross members;

Figure 8 is an enlarged fragmentary longitudinal sectional elevation of the cross member over which a vehicle must pass in entering said lift;

Figure 9 is an enlarged fragmentary side elevation of one of the track beam members of said lift;

Figure 10 is a fragmentary top plan view of the carriage of said lift showing a form of chock such as is suitable for the rear wheels of vehicles;

Figure 11 is a transverse sectional elevation of the carriage and chocks shown in Figure 10;

Figure 12 is a fragmentary top plan view of the carriage of said lift showing a form of chock such as is suitable for the front wheels of vehicles;

Figure 13 is a transverse sectional elevation of the carriage and chocks shown in Figure 12;

Figure 14 is an enlarged fragmentary side elevation of one of the entrance corner posts showing the pulley cover plate removed;

Figure 15 is an enlarged elevation partly in section of the post shown in Figure 14, the section being taken substantially in the plane as indicated by the line 15—15 of Figure 14;

Figure 18 is an enlarged sectional top plan view of the winding drums for said lift;

Figure 19 is an enlarged fragmentary sectional elevation of the form of latch mechanism provided in the entrance posts;

Figure 20 is a side elevation of the latch mechanism shown in Figure 19, the same being taken substantially at 90 deg. from said Figure 19;

Figure 24 is an enlarged fragmentary sectional elevation of the post shown in Figure 22 showing a portion of the latch control;

Figure 25 is an enlarged fragmentary sectional elevation of the post and mechanism shown in Figure 24, the same being taken substantially at 90 deg. from said Figure 24 and showing the left hand control for the operating mechanism;

Figure 26 is a fragmentary side elevation of one of the control slides shown in Figures 24 and 25;

Figure 27 is a top plan view of the control cross member showing the operating mechanism;

Figure 29 is an enlarged fragmentary top plan view of a portion of the control mechanism;

Figure 30 is an enlarged fragmentary sectional elevation of a portion of the gearing of the drum operating mechanism;

Figure 31 is an enlarged elevation, partly in section, of the pulley drive and gearing mechanism for operation of the drums;

Figure 32 is an enlarged longitudinal sectional elevation showing the clutch and brake mechanism;

Figure 33 is an enlarged fragmentary sectional elevation of the clutch latch mechanism, the same being taken substantially in the plane as indicated by the line 33—33 of Figure 32;

Figure 34 is an enlarged fragmentary elevation of the safety bar mechanism;

Figure 35 is a side elevation view of the control cross beam assembly showing a portion of the operating controls;

Figure 36 is a top plan view of the beam and operating controls shown in Figure 35;

Figure 37 is a transverse sectional elevation taken substantially in the plane as indicated by the line 37—37 of Figure 35;

Figure 38 is a transverse sectional elevation taken substantially in the plane as indicated by the line 38—38 of Figure 35;

Figure 39 is an elevation of one form of switch box;

Figure 40 is a sectional elevation of the switch box shown in Figure 39, the same being taken substantially at 90 deg. from said Figure 39;

Figure 41 is a wiring diagram showing the electrical connections from a source of energy to the motor through the switch box shown in Figures 39 and 40;

Figure 42 is an elevation of another form of switch box;

Figure 43 is a fragmentary sectional elevation of the switch box shown in Figure 42, the same being taken substantially at 90 deg. from said Figure 42;

Figure 44 is a fragmentary sectional bottom plan view of the switch box shown in Figures 42 and 43;

Figure 45 is an enlarged elevation of the switch trunnion assembly taken as looking toward the right as viewed in Figure 43;

Figure 46 is a more or less diagrammatic view of the switch plate assembly indicating the electrical connections therefor.

Figure 1:
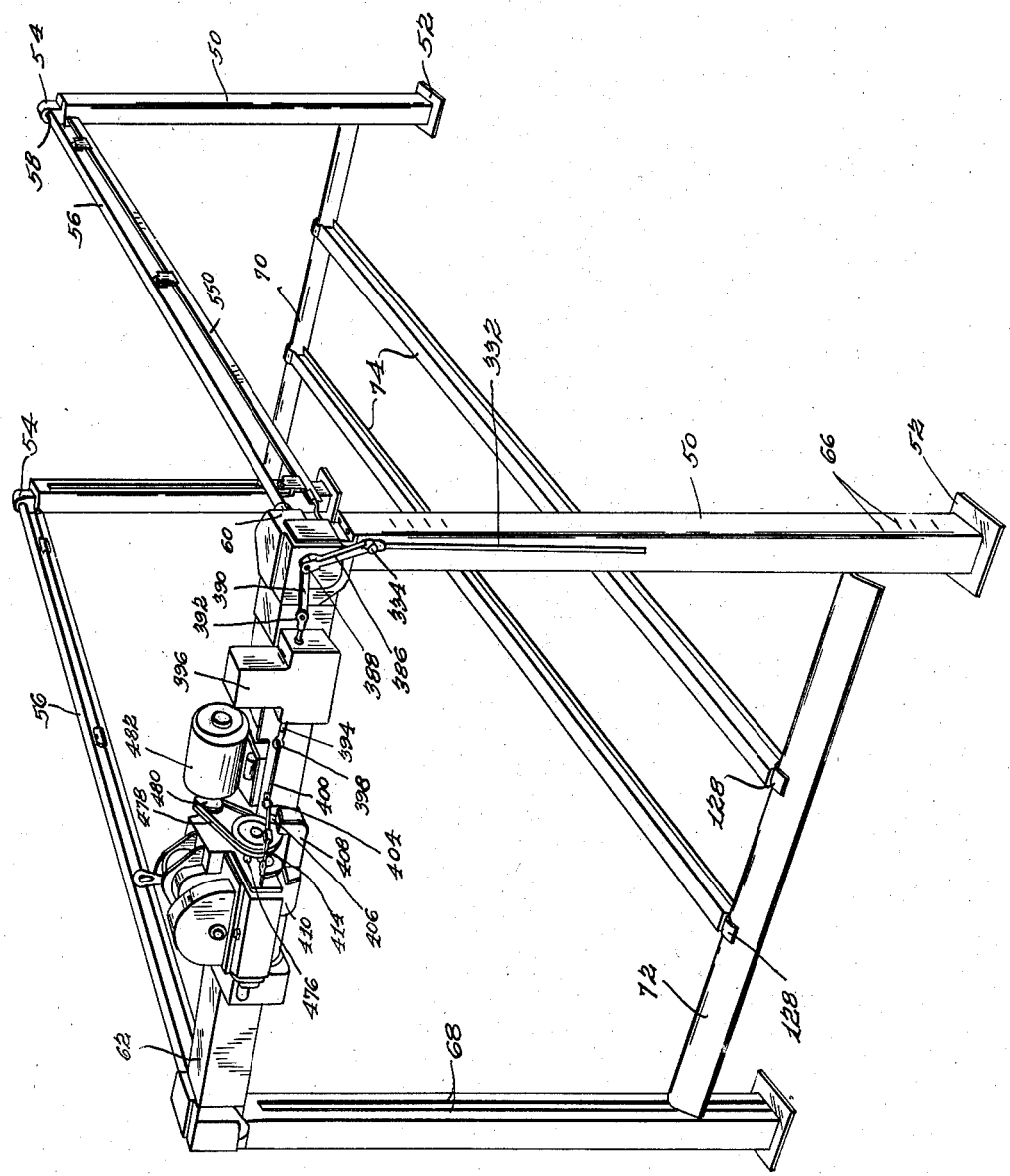
Figure 1 is a perspective elevation of a vehicle lift embodying the invention.
Figure 3:
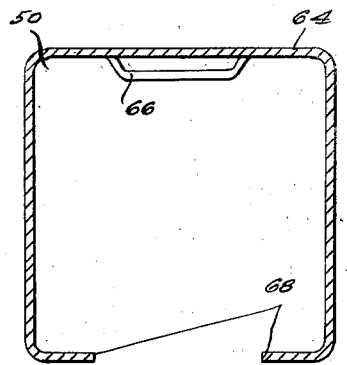
Figure 3 is an enlarged sectional plan of said corner post, the same being taken substantially in the plane as indicated by the line 3—3 of Figure 2.
Figure 2:
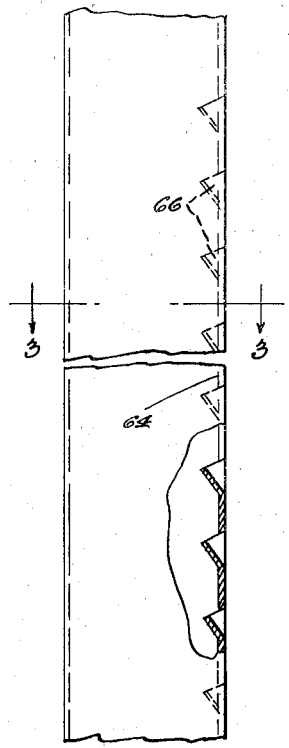
Figure 2 is an enlarged side elevation of a portion of one of the corner posts of said lift.
Figure 28:
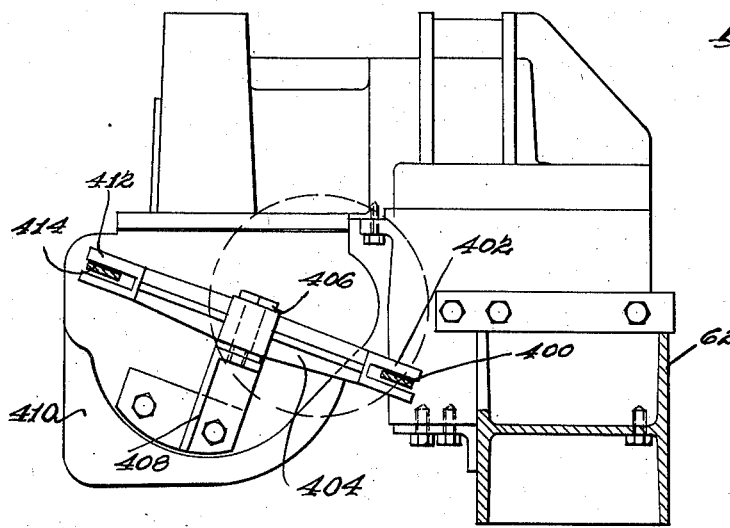
Figure 28 is an end elevation partly in section of a portion of the control mechanism shown in Figure 27, the same being taken substantially in the plane as indicated by the line 28—28 of Figure 27.

The hoist herein illustrated is of the four-post type, including the spaced vertically extending corner posts 50 welded or otherwise secured to the base or foot pieces 52, the upper ends of the rear or entrance pair of posts being provided with the head pieces 54, to which the parallelly disposed connecting members 56 are connected as at 58. Said connecting members at their opposite ends are connected as through housings 60 to the front pair of supporting posts. The front pair of posts is connected adjacent the opposite ends thereof by means of the upper crosstie members 62, forming a support for the control mechanism of the hoist, one of the vertical posts forming a support for the operating means therefor.

The hoist illustrated is of the free wheel type, though it is of course to be understood that the hoist contemplated herein is equally adapted for the roll-on type.

Each of the vertically extending posts 50 is substantially channel-shaped, being preferably formed in one piece of suitable stock and of square configuration, the channel being formed with the wall 64 provided with upwardly opening depressed portions 66 forming a safety rack, the opposite side thereof being formed with facing flanges 68, forming an elongated opening or slot for the reception of the transverse members of the undercarriage. In the embodiment illustrated, the undercarriage consists essentially of the rear and front transverse cross members 70 and 72 to which the longitudinally disposed spaced beams 74 are connected.

The cross members 70 and 72 are preferably of angle or inverted V shape, as shown at 76, disposed so that the apex 78 of said members is disposed upwardly, the legs thereof forming downwardly inclined members from the apex, and said members 76 are provided with the tubular members 80 disposed within the apex, being suitably secured to each other as by welding. The tubular members form a guide for the safety latch members 82 slidably mounted therein, said members being provided with the rack portion 84 adapted, when the latch members are in an extended position, to engage the rack members 66 to prevent the undercarriage from dropping. In normal operation the latches are retracted by means of the supporting cables 86 for the undercarriage, each of said cables passing around seat 88 of its latch member and extending inwardly and being secured to the fastening means 90, which fastening means is secured to the transverse members as at 92. The latch members are urged outwardly by means of the coil spring 94, disposed between the latch members and the stop 96, being preferably guided and retained by means of the pin 98.

The transverse members are also provided with the safety hooks or hook members 100, secured thereto as at 102. The hook members extend upwardly and, in the event a supporting cable elongates without severing, said hook members are adapted to engage the rack members 66, thus preventing the undercarriage from falling. The transverse members are guided in their vertical movement between the flanges 68 by means of the member 104, said member being likewise secured to the transverse members at 106. The member 104 consists essentially of the body portion 108 provided with suitable apertures 110 for accommodating securing means, and is also provided with inwardly extending slotted portions 112 slidably engaging the flanges 68.

The rear cross member 70 is provided with depressed portions 114 for permitting the wheel of the vehicle to readily pass over the cross member, said member as shown being formed by removing portions of the apex and flanges of the member, flanging the side walls of the openings as at 116, and enclosing the opening by welding portions 118 therein. The cross member may be reenforced by a flat tie member 120, connected to the member 76 by means of the blocks 122, the end blocks forming anchoring means for the cable securing means 92.

The cross members 70 and 72 are connected by means of the longitudinal members 74 as has already been described, said members preferably consisting essentially of a central portion, preferably of I beam formation 124, depressed adjacent the ends thereof as at 126 and being secured to the connecting members 128; said members being flanged as at 130 and extending below the lower flange of the I beam, the upward extension being arched as at 132 to conform to the shape of the transverse members 70 and 72 and engaging and overlying the legs of the member 76, being secured thereto.

The I beam members 124, being of extended length, are preferably reenforced by means of the members 134 which may be of flat bar stock. In practice it has been found that under certain conditions the I beams will be deflected, particularly as the depth of the I beam is limited by the clearance of the vehicle to be lifted, and further, the weight of the undercarriage must be kept as low as possible commensurate with the required strength. Therefore, in applying the reenforcement 134 the beam 124 is deflected in the opposite direction from which it would normally bend, that is, it is bowed upwardly. The reenforcement 134 is then welded in position while the beam is in flexed condition and thereafter the beam is released. By this formation it has been found that a beam is provided of sufficient rigidity so that, to all practical purposes, it will not flex when in use.

In a hoist of the free wheel type it is necessary to provide means such as chocks for supporting the axle of the vehicle to be lifted. The types of chock used must be of such character as to be capable of use with different automobiles. For example, where an automobile is provided with knee action, a chock must be provided to receive the front wheel suspension, which chock may be entirely different from one used to engage the rear axle or other different type of suspension. In providing a chock for the rear axle, it must be borne in mind that a vehicle is usually rolled on the lift so that the front of the vehicle faces the so-called front posts, and thus the chocks for engaging the rear axle must be moved to a position to permit the front wheels of the vehicle to readily pass to the front of the lift.

In providing such chocks, a desirable form of chock is illustrated in Figures 10 and 11. These chocks may remain on the lift while the vehicle is being rolled to its position for lifting, yet at the same time the chocks must be disposed below the level of the top portion of the undercarriage so that deflection of the springs of the vehicle may be permitted without any portion of the vehicle striking the chocks.

The chocks on one side are provided with the spaced straps 136 extending over one of the beams 74 and being supported thereon, the straps being connected to the bracket 138 including spaced connected bracket members, said bracket having a portion received in the inner channel of the I beam. The bracket and straps are connected to the transverse beam member 140 which is provided in its opposite end with a bearing 142 adapted to be received in the inner channel of the opposite beam 74. The chocks 144 and 146 are provided with the depending bracket members 148 and 150 pivoted to the shafts 152 and 154 of the bracket 138 and the member 142, respectively, said brackets also being joined by the straps 143.

The operating rod 156 is pivoted to the bracket 138 and is provided with the hand operating member 158, said member also being provided with the lever 160 connected as by means of the link 162 to the bell crank 164 fixedly mounted on the shaft 152. The bell crank is pivoted as at 166 to the transverse rod 168, which in turn is pivoted as at 170 to the member 150.

It will thus be seen that when the chocks are in operative position, the bases thereof are directly supported on the respective beams 74. When it is desired to move the chocks to inoperative position, the rod 156 is rotated in a counterclockwise direction as viewed in Figure 11, which will move the chocks inwardly to inoperative position, as shown in dotted lines in said figure, substantially below the top of the longitudinal supporting members.

Suitable supports for the front axles of vehicles are shown in Figures 12 and 13, said supports or axle block assembly comprising the transverse frame 172, the ends of which are preferably square and project beyond the beams 74, said ends being provided with the supporting members 174 for vehicles embodying knee action, said members preferably sloping downwardly and outwardly. The guide member 176 may be provided on one side of one of the frame members 74 for engaging the outer edge of the upper flange of one of said members 74, shown as the one to the right in Figure 13. The frame members are provided with the brackets 178 and 180 depending inwardly of the beams, the bracket 178 forming a journal for the operating rod 182, likewise provided with a hand hold 184. The chock 186 is provided with a depending portion for fixedly engaging the rod 182 and is provided with the lever or bracket 188 to which the transverse rod 190 is pivoted. The other end of the rod 190 is pivoted as at 192 to the depending portion 194 of the chock 196, and said depending portion is pivoted to the brackets 180 as by means of the shaft 198. Again it will be seen that when the chocks 186 and 196 are in operative position they are fully supported on the tops of beams yet they may readily be moved to inoperative position out of the path of a vehicle. It will be appreciated that with the forms of chocks illustrated they may be readily moved along the beams 74 to any desired position to accommodate vehicles of any wheel base.

Figure 16:
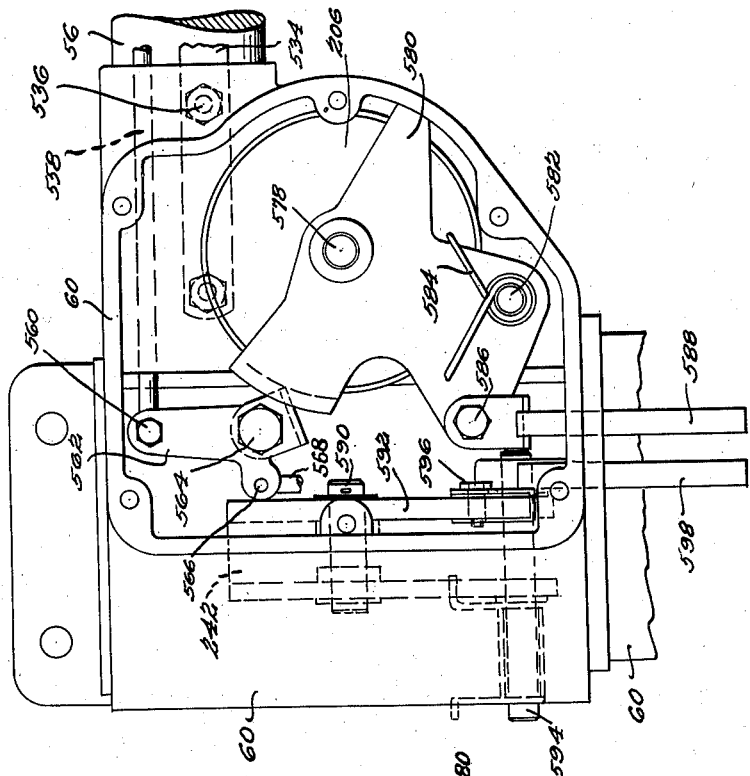
Figure 16 is an enlarged fragmentary side elevation of one of the corner posts disposed at the operating end of said lift, the same showing the pulley cover plate removed.
Figure 17:
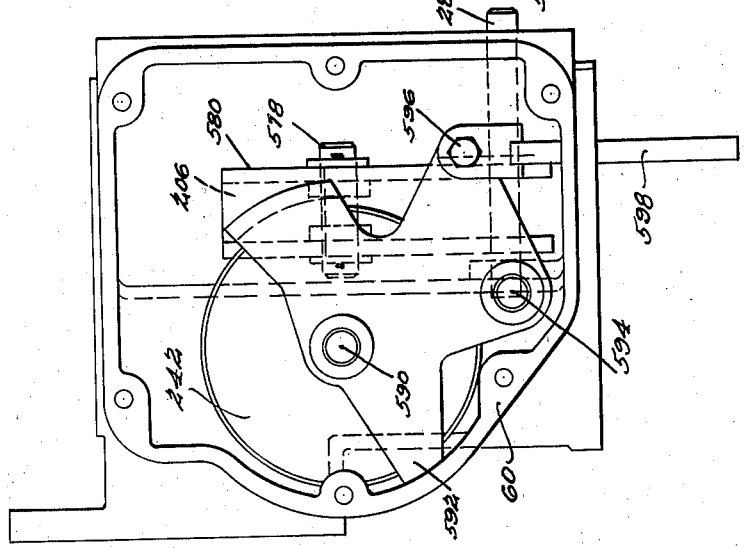
Figure 17 is an enlarged fragmentary end elevation of the post illustrated in Figure 16, the same being taken substantially at 90 degrees from said Figure 16.
Figure 23:
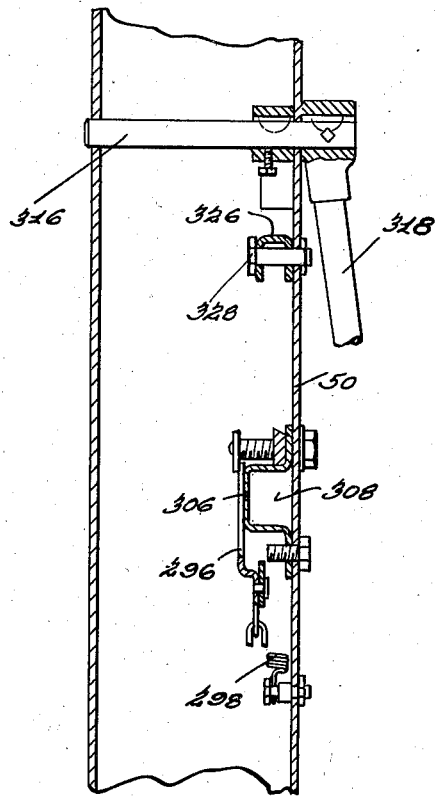
Figure 23 is an enlarged fragmentary sectional elevation of the latch mechanism shown in Figure 22, the same being taken substantially at 90 deg. from said Figure 22 and showing the right hand control for the operating mechanism.

The supporting cables 86 for the rear cross members 70 extend upwardly within the posts 50 and pass over pulleys 200, shown in Figures 14 and 15, disposed within the heads 54, the pulleys being supported on suitable bearings 202 provided on the shafts 204. The cables pass through the tubes 56 into the housings 60 provided on the front post assemblies and pass around the respective pulleys 206 shown in Figures 16 and 17 into the cross member 62 to the cable drums 208 and 210 shown in Figure 18, the cables from the rear posts 50 winding on the inside portions 212 and 214 of the drums 208 and 210 and suitably secured thereto as at 216 shown on one of the drums 210. The drums 208 and 210 are supported on the bearings 218, 220, 222 and 224 provided on the shafts 226 and 228, and the drums are provided with suitable oil retaining means 230, 232, 234 and 236, said drums being also provided with intermeshing gear members 238 and 240. The cables in the front posts 50 extend upwardly into the housing 60 and pass over the pulleys 242 into the cross member 62 and are received and suitably secured to the portions 244 and 246 of the drums 208 and 210. Inasmuch as the cables are completely enclosed in the housing 248 in which the shafts 226 and 228 are supported, means is provided adjacent each portion of the drums for preventing the cables from being received in any other than predetermined manner in the respective grooves provided in the drums. This means, in the embodiment shown, is in the form of plates 250 and 252 disposed adjacent each cable portion and extending horizontally of the housing, the plates being spaced 180 deg. apart and being disposed so that the outer periphery of the drum is spaced from said plates a distance less than cable diameter.

The shafts 204 are provided with the bell cranks 254 provided with the arms 256 to which the rod 258 is pivoted as at 260, the rod 258 extending downwardly within the rear posts 50 and being pivotally connected at at 262 to the lever 264 pivoted as at 266 to the housing formed of the member 268 and the strap 270, (Figures 19 and 20), said housing being disposed near the top of the uppermost position of the carriage. The lever 264 is pivotally connected as at 272 to the latch member 274 guided in the housing member 268, it being seen that when the bell crank 254 is moved in a counterclockwise direction as viewed in Figure 14, the rod 258 will move upwardly to project the latch member 274. The latch member 274 is, of course, disposed near the top of the uppermost position of the carriage and when said latch is in projected position it is adapted to underlie the projected portions 276 of the members 104 (Figure 4), whereby it is necessary to retract the latch in order to permit the carriage to be lowered.

Figure 22:
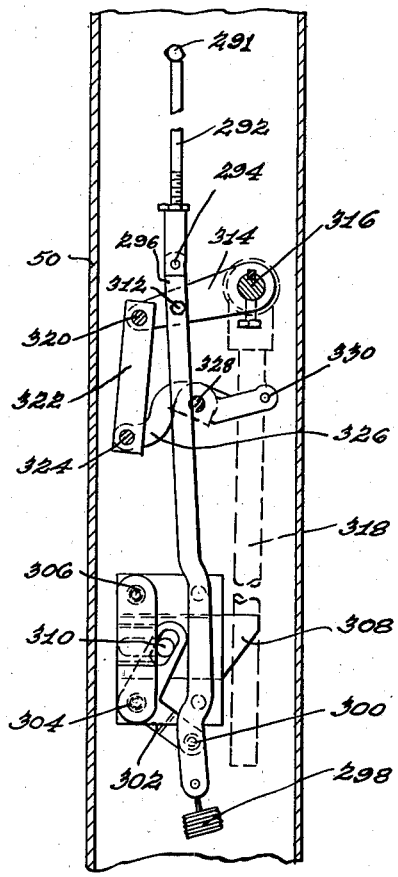
Figure 22 is an enlarged fragmentary side elevation of the latch mechanism for the control posts.
Figure 21:
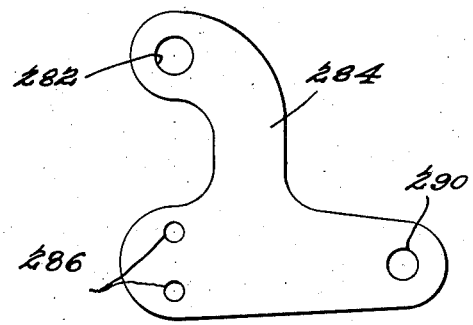
Figure 21 is a detail of the latch control bell crank.

In order to provide the retracting means, the bell crank 254 is pivoted as at 278 to the rod 280 (Figure 14), said rod extending through the member 56, being pivotally connected as at 282 to the bell crank 284 (Figures 21 and 35), the bell crank being secured as at 286 to the shaft 288 (Figure 35), extending between the front end posts 50. The bell crank is also pivoted as at 290 to a portion 291 of the rod 292 disposed in the front posts, said rod extending downwardly and being pivoted as at 294 to the member 296 (Figure 22), said member 296 being urged downwardly by means of the spring 298. The member 296 is pivotally connected as at 300 to the bell crank 302, said bell crank being pivoted as at 304 to the housing member 306 which receives the latching member 308, said member being normally urged outwardly by said spring 298. The bell crank 302 is loosely pivoted at at 310 to said latch and the member 296 is also pivotally connected as at 312 to the lever 314 fixedly mounted on the shaft 316, said shaft extending outwardly of the post and being provided with the operating handle 318. The lever 314 is pivotally connected as at 320 with a strap 322 extending downwardly and pivoted as at 324 to the bell crank or lever 326, said lever being pivotally connected as at 328 to the post and having an outwardly extending portion 330 adapted under certain conditions to form an abutment, the carriage moving the lever 330 upwardly in a counter-clockwise direction. The operating handle 318 is on the inner side of the control corner post, that is, on the opposite side of the post from the lever 332 and is for normal right hand movement.

The control lever 332 (Figures 24 and 25), is pivoted as to the shaft 334 which extends into the post 50, being suitably pivotally mounted thereon, and said lever 332 is disposed on the outside of the post for normal left hand operation. Within the post the lever 336 is provided fixed to the shaft 334 and pivoted as at 338 to the link 340, said link being pivoted as at 342 to the bell crank 344, said bell crank being pivoted as at 346 to the post. The other arm of the bell crank is pivoted as at 348 to the link 350, said link being pivoted as at 352 to the vertical stop member 354, said stop member having a downwardly facing limit stop 356 thereon and having elongated apertures 358 and 360, having sliding cooperation with the pins 362 and 364. The stop member 354 is pivoted as at 366 to the lower stop member 368 slidably mounted by means of the slots 370 and 372, and pins 374 and 376, said member having a laterally extending stop lug 378 thereon disposed adjacent the lower portion of the post. The rod 332 may be locked in inoperative position by suitable locking means (not shown) in cooperative engagement with the outwardly extending yoke 380 pivoted as at 382 to the supporting member 384 provided on the post, the member 380 being adapted to be pivoted into or out of engagement with the operating member 332.

It will be seen that when the carriage descends, unless stopped at a predetermined position, it will engage the lug 378, lowering the linkage causing the operating handle 332 to be moved to inoperative position. In its upper travel similarly the carriage may engage the projecting limit stop 356 to cause the lever 332 to be moved to inoperative position. The shaft 334 is also provided with the upwardly extending lever 386 pivotally connected as at 388 to the link 390 (Figure 1), and the link 390 is pivoted as at 392 to the rod 394 which extends into the switch control housing 396 for operation of switch mechanism to be later described.

The rod 394 is pivoted as at 398 to the link 400, said link being pivoted as at 402 (Figure 27) to the lever 404. The lever 404 is pivoted as at 406 to the bracket 408 provided on the transmission housing 410 supported on the crossmember 62. The opposite end of the lever is pivotally connected as at 412 to the link 414, which in turn is connected as at 416 to the connection 418 provided on the rod 420 which extends within the transmission housing 410 (Figure 29). The rod 420 is suitably mounted in bearings 422 and 424 and is provided with a collar 426 forming stops for the springs 428 and 430, the opposite ends of the springs being seated on the seats 432, and 434 of the member 436.

On each side of the collar 426 sleeves 438 and 440 are provided of such length that they will engage the seat members 432 or 434 to positively move the member 436, if the member has not already been moved by the springs, for a purpose to be later described. The member 436 is slidably mounted on the fixed rod 442 secured in the housing as at 444 and 446 and is provided with the spaced stops 448 and 450. The member 436 is provided with the clutch shifting member 452 (Figures 29 and 32) which engages the clutch block 454 (Figure 32), which is slidably mounted between the gears 456 and 458 provided on the shaft 460, the shaft being mounted on the bearings 462 and 464.

The clutch block 454 is adapted to be slidably mounted on the shaft 460, but is rotated therewith, being connected thereto by means of a suitable key 466. The gear 456 is mounted on the anti-friction bearings 467 provided on the shaft 460, said gear being directly geared to the gear 468, fixedly mounted on the shaft 470, said shaft being pivotally mounted as by the bearings 472 and 474 in the housing 410. The shaft 470 extends outwardly of the housing and is provided with suitable pulleys 476 connected by suitable belts 478 to pulleys 480 of the operating motor 482, likewise mounted on the member 62. The shaft 470 is provided with the sprocket 484 which is connected through a suitable chain drive to the sprocket 486 pivotally mounted on the bearings 488 provided on the shaft 460, a suitable idler 490 being provided for taking up any slack in the chain.

It will thus be seen that by selective engagement by the clutch member 454 and the members 456 and 458, reversal of direction of rotation of the shaft 460 is attained without the necessity of providing a reversible motor. The shaft 460 is connected by means of the worm 492 to the gear 494, said gear 494 being mounted on the shaft 496 extending transversely of the housing 410, being pivotally mounted thereon by means of suitable bearings 498 and 500. The shaft 496 is provided with the gear 502 which meshes with the gear 238 for controlling operation of the winding drums 208 and 210 in accordance with the operation of the clutch.

The shaft 460 is provided with the guide member 504 fixed thereto and providing a guide for the latch or dog 506, said latch being slotted as at 508 to provide relative sliding movement between said latch and the shaft 460. The latch member is adapted to engage the latch member 510 in the down direction of movement of the carriage, that is, when the shaft 460 is rotating in a clockwise direction. The housing member 512 is mounted on the anti-friction bearings 514 on the shaft 460 and is connected as at 516 to the brake plate 518, loosely mounted on the member 504. The stop brake lining 520 is interposed between the brake plate 518 and the brake member 522, said member being guided by means of the rods 524 and being urged toward braking position by means of the springs 526. It will thus be seen that when the carriage is being raised the brake is ineffective as the locking dog 506 will not engage the member 510 as the shaft 460 is rotating in a counterclockwise direction, but when the carriage is being lowered the brake is always effective.

The members 56 are preferably assembled under an initial compression by means of the rods 528 extending therethrough, in order to prevent sagging of the tubes, and by this construction the size of the tubes 56 can be materially reduced, showing a great saving in cost. The tubes 56 are provided with the spaced brackets 530, one of said brackets being provided with the elongated aperture 532 to accommodate the twisted strap 534 (indicated by dotted lines in Figure 34) secured as at 536 (Figure 16) to the housing members 60 to prevent rotation of the tubes 56. The biased links 538 and 540 (Figure 34), are pivoted as at 542 and 544 to the brackets 530, being maintained in the biased position by means of the engagement of the inner leg 546 with the pins 548 provided on the safety rod 550, said rod being pivoted as at 552 to said links and being adapted, in a manner to be later described, to prevent further upward movement of the lift carriage should the safety rod be moved upwardly as when a vehicle door engages said rod. The link 540 is provided with the arm 554 adapted to be pivotally connected at 556 to the rod 558, which is pivotally connected as at 560 to the bell crank 562 pivoted as at 564 in the housing 60. The bell cranks 562 on each side of the hoist respectively are pivotally connected as at 566 to the respective rods 568 (Figures 16 and 36) and 570, said rods being pivotally connected as at 572 and 574 to the lever 576 (Figure 36).

In the event any of the cables which support the carriage slacken or break, means is provided for rendering the motor inoperative. The pulley 206 is pivoted as at 578 to the sheave support 580 which in turn is pivotally connected as at 582 to the housing 60, a spring 584 being provided, urging the sheave support and sheave in a counterclockwise direction as used in Figure 16. The sheave support is pivotally connected as at 586 to the operating rod 588. The sheave 242 is pivotally connected as at 590 to the sheave support or housing 592, said support being pivotally connected as at 594 to the housing 60, being provided with a spring (not shown) normally urging the sheave housing in a clockwise direction as viewed in Figure 17.

The sheave support 592 is pivotally connected as at 596 to the rod 598. The rods 588 and 598 are disposed to engage the lever 600 (Figure 36), said lever being pivoted as at 602 to the member 62. The levers 600 are respectively connected to the links 604 and 606, said links being pivotally connected as at 608 and 610 to the bellcrank 612, said bellcrank being pivotally connected as at 614 to the member 62. The shaft 288 is provided with a lever 616 which is pivotally connected as at 618 to the transversely extending link or push rod 620.

Two forms of switch boxes are shown. In the form illustrated in Figures 39 to 41 inclusive, the operating switch means is adapted to be rendered inoperative by means of the plungers 622 and 624 (Figure 36), the member 622 being adapted to be operated by the leg 626 of the bellcrank 576, the push rod 624 being adapted to be operated by the leg 628 of the bellcrank 612. Within the switch box 396 there is provided a solenoid operated contactor 630. Current is supplied through the power lines 632 and 634 to the contactor 630, the line 632 being connected to the solenoid of said contactor as at 636. The solenoid is also connected as at 638 to the conductor 640 which is connected to one side of the normally opened up-switch 642. The other side of switch 642 being connected through the conductor 644 to one side of the normally closed switch 646, the other side of said switch 646 being connected through the conductor 648 to one side of the normally closed switch 650. The other side of the switch 650 is connected through the conductor 652 to one side of the normally opened down-switch 654, the other side of said switch 654 being connected through the conductor 656 to the solenoid at 638. The conductor 648 is also connected through the conductor 658 with the normally open switch 660 which is adapted for manual operation as by the push button 662. The switch 660 is also connected through the conductor 658 to one side of the normally opened switch 664, the other side of said switch 664 being connected through the conductor 666 to the other side of the switch 660, and through the conductor 668 to the power line 634. The outlets from the contactor to the motor are shown at 670 and 672.

In operation of this form of device, assuming the carriage to be in lowermost position, the right hand lever 318 is moved in a counterclockwise direction as viewed in Figure 1 to rotate the rod 288, causing the lever 616 to move the push rod 620 to close the switch 664. The left hand lever 332 is also moved in a counterclockwise direction, causing the rod 394 to be moved toward the left as viewed in Figure 39. The rod is provided with the switch operating member 674 which will close the switch 642. Closing the switch 642 permits the current to flow through the contactor 630, conductor 640, switch 642, switch 646, conductors 648 and 658, through the switch 664. The lever 318 having closed the switch 664 by rotation of the rod 288 in an inward movement of the rod 620, the current then flows through the conductors 666 and 668, permitting operation of the contactor to permit flow of current to the motor through the conductors 670 and 672. Release of either of the operating levers 318 or 332 will open either switch 642 or switch 664, causing an interruption of the current supply, opening the contactor and stopping the motor.

To operate the lift in a down direction, the lever 318 is moved in a counterclockwise direction, while the lever 332 is moved in a clockwise direction, causing the switch 654 to be closed, whereby the current is supplied through the conductor 656, switch 654, conductor 652, switch 650, conductor 648, conductor 658, switch 664 and conductors 666 and 668 in the manner already described, and the lift will be operated downwardly through actuation of the clutch in a manner already described.

In the event the lift should be stopped in a position where it wedges the safety latches such as the latch 274, it would be impossible to operate the lever 318, in which case the pushbutton 662 would be operated to close the switch 660, in which case the lift could only be raised as the current could only pass through the up-switch 642, conductor 644, switch 650, conductor 648, switch 660 and conductor 668. If the lever 332 were operated in a reverse direction, although the current would flow through the down-switch, nevertheless the latches would prevent the hoist from descending. Therefore it would first be necessary to raise the hoist from the latch 274 to then permit normal operation through the levers 318 and 332 to lower the lift.

If the cables are slackened, or if the link 550 is raised through other than normal operation of the device, the levers 600 (Figure 36), will operate to cause the bell crank to move the plunger 624 inwardly, or the bellcrank 626 will cause the plunger 622 to move inwardly to open either the normally closed switch 650 or the normally closed switch 646 to arrest operation of the motor by interrupting the flow of the current thereto, it being noted that the bellcrank 612 only operates when the hoist is being lowered while the bellcrank 626 only operates when the switch is being raised.

In the modified form of switch operating means illustrated in Figures 42 to 46 inclusive, as above, the rod 394 enters the switch housing 676 and is provided with a lever 678, said lever being pivoted for limited rotation with respect to the rod 394, being provided with the upstanding member 680 to which one end of the spring 682 is secured, the opposite end of the spring being secured to the pin 684 provided on the rod 394. One end of the lever 678 is provided with the longitudinal member 686, said member forming means for engaging the contactor member 688 as shown in the dotted lines in Figure 43 to open the contact when the rod 394 is being moved from one position to the other, by member 686 being raised by means of the fixed cam 690 supported at 692 adapted to be engaged by the adjustable member 694 provided on the lever 678.

The member 678 is provided with the inwardly extending flanged member 696 and the pivoted shoe 698, said shoe being urged inwardly by means of the spring 700, the shoe being mounted on the pivot 702 and retained by means of the cotter pin 704. The lever 706 is pivotally mounted at 708 and is provided with the upstanding cam portion 710 adapted to be contacted by the member 696 to move said lever in a clockwise direction about the pivot 708, thereby moving the leg 712 inwardly. The lever 714 is pivoted as at 716 and is provided with the cam member 717 connected to the member 718 adapted to be contacted by the member 696 to move the lever 714 in a counterclockwise direction about the pivot 716 to move the leg 720 inwardly.

As before, the current is supplied through the conductors 722 and 724, being connected to the contactor 726, the conductor 722 being connected to the conductor 728, which in turn is connected to the normally opened switch 730. The normally opened switch 730 is adapted for hand operations by means of the depending member 732, the other side of the switch 730 being connected to the normally closed switch 734 corresponding to the switch 646, and said switch is also connected to the normally closed switch 736 through the conductor 738. The other side of the switch 736 is connected through the conductor 740 to the normally open down-switch 742, said switch 742 being connected through the conductor 744 to one side of the normally open up-switch 746, the other side thereof being connected through the conductor 748 to the other normally closed switch 734. The conductor 744 is also connected through the conductor 750 to the solenoid 760.

The contactor in closed position supplies current to the contacts 752 and 754 which in turn are connected to the motor. Assuming the lift to be in lowered position, as before the levers 318 and 332 are moved in a counterclockwise direction. The rod 394 is moved toward the left, as viewed in Figure 42, by the rod 332, while the rod 318 closes the switch 330. The current is then supplied from the conductors 722, 728, switch 730, conductor 756 disposed between the switch 730 and the switch 734, the switches 734 and 746, conductors 744 and 750 operating the solenoid and contacts to permit flow of current to the motor.

When the rod 394 is moved to close the switch 746 the member 696 is so disposed with relation to the cam 710 as to force the member 712 inwardly to prevent operation of the plunger 624. When the rod 394 is moved to down position the switch 746 is opened, the contactor is opened by the member 686, and in its fully moved position the switch 742 is closed. The switch 730 is closed by the lever 318. Current then flows through the conductor 728, switch 730, conductors 756, 738, switch 736, conductor 740, switch 742 and conductors 744 and 750, operating the contactor and motor as described. In that position the member 696 engages the cam member 718 to move the member 714 inwardly to prevent operation of the member 622.

While locking the cams 710 and 718 in the up or down positions, respectively, the operator is enabled to release the hoist if it is stopped by any obstruction, as for example, if the hoist is stopped in being lowered. The switch for raising the hoist is in released position so that the hoist can only be raised to release the carriage from the obstruction, after which it can be lowered after the obstruction is removed, and the contrary is true with respect to the opposite operation. The shoe 698 is provided to open the normally closed switches 734 and 736, which opens the switches prior to the mechanical opening of the contactor by engagement of the members 686 and 688 so that the contactor is always open or inoperative when the solenoid is inoperative.

In the event the hoist comes down on an obstruction, the slacking of the cable will cause the member 622 to move inwardly, rotating the lever 714, which causes the switch 736 to be opened and also the contactor to be opened by rotation of the member 678 in case this has not already been accomplished. Similar operation occurs by the member 624 in case, for example, the door of a vehicle is opened and contacts the rods 550 in the manner already described.

In the arrangement of the switches shown, it is to be understood that a switch is first of all operated electrically and then operated mechanically, thereby permitting a positive operation of the switches at all times.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In a vehicle hoist, the combination of four posts positioned to provide a space into which a vehicle may be moved, pairs of said posts being connected by a member, and means for placing an initial stress in said member.

2. In a vehicle hoist, the combination of four posts positioned to provide a space into which a vehicle may be moved, pairs of said posts being connected by a member, and means disposed within said member and secured to the adjacent posts for placing an initial stress in said member.

3. In a vehicle hoist, the combination of four posts positioned to provide a space into which a vehicle may be moved, bracing means connecting the upper end portions of the two posts at each side of the space, a crosstie connecting the upper portion of the front post of each pair of connected posts, a carriage guided by said posts, sheaves at the upper portion of each post, cables passing over said sheaves and connected to said carriage, a winding drum for the cables of each of said pairs of posts, means for rotating said drums including a uni-directional motor, reversing means interposed between said motor and drums, and means adjacent one of said posts for controlling actuation of said motor and said reversing means.

4. In a vehicle hoist, the combination of four posts positioned to provide a space into which a vehicle may be moved, a carriage movable vertically between said posts, means for moving said carriage including control means at one of said posts, said control means including a pivoted lever, means movably mounted in the post and connected to said lever, said means being engageable by said carriage in its uppermost position to move said lever to render said control means inoperative.

5. In a vehicle hoist, the combination of four posts positioned to provide a space into which a vehicle may be moved, a carriage movable vertically between said posts, means for moving said carriage including control means at one of said posts, said control means including a pivoted lever, means movably mounted in the post and connected to said lever, said means being engageable by said carriage in its lowermost position to move said lever to render said control means inoperative.

6. In a vehicle hoist, the combination of four posts positioned to provide a space into which a vehicle may be moved, a carriage movable vertically between said posts, means for moving said carriage including a flexible cable extending within one of said posts, control means for moving said cable, a sheave adjacent said post for guiding said cable, a member pivoted with respect to said sheave and with respect to said post and connected to said control means, and a latch member disposed in said post and connected to said last named member and movable thereby, said latch member being adapted to be moved to supportingly engage said carriage.

7. In a vehicle hoist, the combination of four posts positioned to provide a space into which a vehicle may be moved, a carriage movable vertically between said posts, means for moving said carriage including a flexible cable extending within one of said posts, control means for moving said cable, a sheave adjacent said post for guiding said cable, a member pivoted with respect to said sheave and with respect to said post and connected to said control means, a latch member disposed in said post and connected to said last named member and movable thereby, said latch member being adapted to be moved to supportingly engage said carriage and including a slidable latch portion, guide means therefor, a member pivoted adjacent said guide means and to said latch portion, and a connection between said last named member and said first named member.

8. In a vehicle hoist, the combination of four posts positioned to provide a space into which a vehicle may be moved, a carriage movable vertically between said posts, means for moving said carriage, control means for controlling said first named means, said control means including a lever pivotally mounted upon one of said posts, a bell crank pivoted to said post, a connection between said lever and said bell crank, one of the arms of said bell crank forming an abutment for engagement with said carriage for moving said lever to inoperative position, a latch member slidably mounted in said post and adapted to be projected below said carriage when said carriage has been moved to a predetermined position, guide means for said latch member, a bell crank loosely pivoted to said latch member, a connection between said bell crank and said control lever, and means normally tending to project said latch.

9. A post member for a hoist including a substantially U-shaped body portion, and spaced upwardly projecting ledges forming a rack disposed within said U-shaped member.

10. In a vehicle hoist, the combination of four posts positioned to provide a space into which a vehicle may be moved, a carriage movable vertically between said posts, means for moving said carriage, said posts comprising substantially U-shaped members, said posts being provided with rack means therein, said carriage being provided with means projecting within the U-shaped member, a releasable rack member complementary to said first-named rack means normally urged toward said first named rack means, a cable forming a part of the means for moving said carriage and normally retracting said rack member, and an upstanding hook member provided on said carriage for engaging said rack member in the event said carriage is biased with respect to said posts.

11. In a vehicle hoist, the combination of four posts positioned to provide a space into which a vehicle may be moved, a carriage movable vertically between said posts, means for moving said carriage, control means for said carriage including a slidable member, said slidable member being provided with a seat member, compression springs disposed on each side of said seat member, a frame member forming seats for said springs, a fixed rod disposed adjacent said slide rod and being provided with adjustable abutments, said abutments being adapted to be contacted by said frame member for compressing said springs to provide stops for said slide rod.

12. In a switch mechanism for a hoist, the combination of a slidable operating rod, a normally open switch connected to a power line, a contactor connected to said power line, a normally closed switch connected to said first named normally open switch, a normally closed switch connected to said second named normally closed switch, a pair of oppositely operated normally open switches connected to said second and third normally closed switches, to each other, and to said power line, means on said slidable rod for selectively operating said normally open switches for selectively controlling the flow of said current, levers controlled by plungers for selectively opening said second and third named normally closed switches, cam means provided on said slidable member, a pivoted spring-pressed shoe mounted on said cam member, said shoe being pivoted on said member, means on said pivoted levers adapted to be disposed in the path of a portion of said cam member, and means adapted to have cooperative relation to said plungers and safety mechanism of said hoist for rendering said switch mechanism inoperative.

13. In a carriage for a lift, the combination of spaced end members, a longitudinal member disposed therebetween, said longitudinal member including end connecting members secured to said end members, said longitudinal member being initially flexed upwardly between the ends thereof, and a reenforcing member disposed before said longitudinal member and secured thereto.

14. Chock mechanism for a lift carriage including a frame adapted to be supported transversely of spaced carriage supports, end members for said frame tapering outwardly and downwardly, depending members on said frame, chocks connected to each other and pivoted to said depending members, an operating member connected to one of said chocks for moving said chocks to operative or inoperative positions, said chocks when in inoperative position being below said frame, said chocks when in operative position engaging said carriage supports.

15. A lift carriage and chock mechanism therefor, said carriage including spaced members each having an inwardly directed flange below the top thereof, slidable members disposed below the top of said first named members and supported on each flange, one of said slidable members having spaced straps embracing the top of the adjacent spaced member, transverse straps connecting said slidable members, chock members pivoted to each slidable member and to each other between said spaced members and said straps, said chock members when in inoperative position being below the tops of said spaced members and when in operative position engaging the tops of said spaced members, and a handle connected to one of said chocks and extending along said spaced members for operating said chock members.

16. A post member for a hoist including a substantially U-shaped body portion having facing guide flanges, spaced upwardly projecting ledges forming a rack disposed within said U-shaped member, a carriage member having guide means embracing said guide flanges, and a plurality of means adapted to engage said rack when said carriage is tipped with respect to said post.

17. In a vehicle hoist, the combination of four posts positioned to provide a space into which a vehicle may be moved, a carriage movable vertically between said posts, means for moving said carriage, said posts comprising substantially U-shaped members, said posts being provided with rack means therein, said carriage being provided with means projecting within the U-shaped member, a releasable rack member complementary to said first-named rack means normally urged toward said first named rack means, and a cable forming a part of the means for moving said carriage and normally retracting said rack member, said rack member engaging said rack means upon release of said cable.

18. A lift carriage and chock mechanism therefor, said carriage including spaced members, slidable members supported on said first named members, said slidable members being connected together, chock members pivoted to said slidable members below the level of the tops of said spaced members, a connection between said chock members, and operating means connected to one of said chock members and disposed substantially below the tops of said first named members for operating said chock members.

SHERWOOD HINDS.